(12) United States Patent
Katata et al.

(10) Patent No.: US 12,165,213 B2
(45) Date of Patent: Dec. 10, 2024

(54) DATA STRUCTURES, STORAGE MEDIA, STORAGE DEVICE AND RECEIVER

(71) Applicant: PIONEER CORPORATION, Tokyo (JP)

(72) Inventors: Keiji Katata, Kawagoe (JP); Takeshi Koda, Kawagoe (JP)

(73) Assignee: PIONEER CORPORATION, Tokyo (JP)

( * ) Notice: Subject to any disclaimer, the term of this patent is extended or adjusted under 35 U.S.C. 154(b) by 0 days.

(21) Appl. No.: 18/080,229

(22) Filed: Dec. 13, 2022

(65) Prior Publication Data

US 2023/0112009 A1 Apr. 13, 2023

Related U.S. Application Data

(63) Continuation of application No. 17/267,468, filed as application No. PCT/JP2019/030001 on Jul. 31, 2019, now abandoned.

(30) Foreign Application Priority Data

Aug. 10, 2018 (JP) .................................. 2018-151559

(51) Int. Cl.
*G06Q 40/00* (2023.01)
*G06F 21/78* (2013.01)
(Continued)

(52) U.S. Cl.
CPC ............. *G06Q 40/08* (2013.01); *G06F 21/78* (2013.01); *G07C 5/008* (2013.01); *G07C 5/0841* (2013.01)

(58) Field of Classification Search
CPC ..... G06Q 40/08; G06F 21/78; G06F 12/1441; G06F 21/606; G06F 2221/2111;
(Continued)

(56) References Cited

U.S. PATENT DOCUMENTS 6,226,575 B1 5/2001 Lu
8,897,742 B2* 11/2014 Johnson .............. H04W 40/244
455/456.3

(Continued)

FOREIGN PATENT DOCUMENTS

CN     105074759 A    11/2015
JP     2001-249914    9/2001
(Continued)

OTHER PUBLICATIONS

Öörni et al: "In-Vehicle Emergency Call Services: eCall and Bey", : IEEE Communications Magazine, vol. 55, Issue: 1, Jan. 2017 (Year: 2017).*

(Continued)

*Primary Examiner* — Edward J Baird
(74) *Attorney, Agent, or Firm* — PROCOPIO, CORY, HARGREAVES & SAVITCH LLP

(57) ABSTRACT

A job request is transmission data transmitted from the vehicle cloud server 30 to the in-vehicle terminal 20 and includes at least: data collection condition information and collection data designation information indicative of contents of a process to be performed by the in-vehicle terminal 20; and deletion prohibition flag indicative of prohibiting the in-vehicle terminal 20 from deleting the job request under a predetermined condition.

10 Claims, 10 Drawing Sheets

(51) Int. Cl.
*G06Q 40/08* (2012.01)
*G07C 5/00* (2006.01)
*G07C 5/08* (2006.01)

(58) Field of Classification Search
CPC ..... G06F 2221/2141; G06F 2221/2143; G06F 21/6209; G07C 5/008; G07C 5/0841
See application file for complete search history.

(56) References Cited

U.S. PATENT DOCUMENTS

| | | |
|---|---|---|
| 2006/0152582 A1 | 7/2006 | Uchida |
| 2007/0247331 A1* | 10/2007 | Angelis ................. G01D 4/006 340/870.02 |
| 2008/0196109 A1 | 8/2008 | Matsuzaki et al. |
| 2008/0301740 A1* | 12/2008 | Tsutsui ................. H04N 5/775 386/E5.07 |
| 2010/0287038 A1 | 11/2010 | Copejans |
| 2011/0191306 A1* | 8/2011 | Akagawa ............. G06F 16/162 707/E17.005 |
| 2012/0022788 A1 | 1/2012 | Yamamoto |
| 2013/0136007 A1* | 5/2013 | Jiang ................. H04L 41/0677 370/242 |
| 2014/0181033 A1* | 6/2014 | Pawar ................. G06F 16/119 707/644 |
| 2014/0365258 A1* | 12/2014 | Vestal ................. G05D 1/0297 901/1 |
| 2015/0365246 A1* | 12/2015 | Kane ................. H04W 4/08 709/203 |
| 2016/0055688 A1 | 2/2016 | Miura et al. |
| 2017/0041475 A1 | 2/2017 | Won et al. |
| 2017/0278320 A1 | 9/2017 | Isozaki |
| 2017/0339056 A1 | 11/2017 | Uno |
| 2018/0032390 A1* | 2/2018 | Rahmanian ......... G06F 11/0754 |
| 2018/0300964 A1* | 10/2018 | Lakshamanan ....... G06F 9/5027 |

FOREIGN PATENT DOCUMENTS

| | | | |
|---|---|---|---|
| JP | 2003-005639 A | 1/2003 | |
| JP | 2005004264 A | 1/2005 | |
| JP | 2005-202109 | 7/2005 | |
| JP | 2006-197156 A | 7/2006 | |
| JP | 2007249951 A | 9/2007 | |
| JP | 2009-140385 | 6/2009 | |
| JP | 2009134551 A | 6/2009 | |
| JP | 2015-088802 A | 5/2015 | |
| JP | 2016111646 A | 6/2016 | |
| JP | 2016156973 A | 9/2016 | |
| JP | 2018055191 A | 4/2018 | |
| WO | 2006/006678 A1 | 1/2006 | |
| WO | WO-2018129358 A1 * | 7/2018 | ............... B60Q 1/50 |

OTHER PUBLICATIONS

Zeng et al: "In-Vehicle Networks Outlook: Achievements and Challenges", IEEE Communications Surveys & Tutorials (vol. 18, Issue: 3, third quarter 2016). (Year: 2016).*
European Search Report issued on the corresponding European Patent Appln. No. 19847380.3 on Mar. 29, 2022.
European Patent Office, Extended European Search Report, Application No. EP 22 20 4082, dated Jun. 13, 2023, in 8 pages.
Japanese Patent Office, Office Action, Application No. JP2022-076559, dated Jun. 13, 2023, in 2 pages.

* cited by examiner

DATA STRUCTURES, STORAGE MEDIA, STORAGE DEVICE AND RECEIVER

CROSS-REFERENCE TO RELATED APPLICATIONS

This application is a continuation of U.S. patent application Ser. No. 17/267,468, filed on Feb. 9, 2021, which is a U.S. National Stage entry of PCT Application No. PCT/JP2019/030001, filed on Jul. 31, 2019, which claims priority to JP Application No. 2018-151559 filed on Aug. 10, 2018. The contents of the foregoing are incorporated by reference.

TECHNICAL FIELD

The present invention relates to data transmitted from an information processing device to another information processing device.

BACKGROUND

Conventionally, a technique for a server device to collect information of sensors installed in a vehicle is known. For example, Patent Reference 1 discloses a driving support device which transmits, when detecting a change point of the partial map based on the output of the sensor installed on a moving body such as a vehicle, change point information associated with the change point to the server device.

PRIOR ART REFERENCES

Patent References

Patent Reference 1: Japanese Patent Laid-Open No. 2016-156973

SUMMARY OF THE INVENTION

Problem to be Solved by the Invention

It is assumed in the future that each company providing various services related to vehicles will operate the servers which specify data for vehicles to upload and collect various information associated with the vehicles necessary for their service provision. In such a system, the vehicle is required to recognize uploading the specified data as a job and to continue executing the job even when the system is restarted. On the other hand, such instruction data may disappear at timing such as vehicle's ignition-off. Therefore, since the server cannot determine whether or not the instruction data remains on the vehicle side, the server needs to continue to provide the instruction data at all times.

The present invention has been made to solve the above issues, and a main object thereof is to provide a data structure suitable for transmission data transmitted when execution of processing is instructed, a storage device for storing the transmission data, and a receiver for receiving to the transmission data.

Means for Solving the Problem

One invention is a data structure for transmission data transmitted from a first information processing device to a second information processing device, the data structure including: processing information indicative of contents of a process to be performed by the second information processing device; and flag information indicative of prohibiting the first information processing device or the second information processing device from deleting the processing information under a predetermined condition.

Another invention is a storage device storing data transmitted from a first information processing device to a second information processing device, the data including: processing information indicative of contents of a process to be performed by the second information processing device; and flag information indicative of prohibiting the first information processing device or the second information processing device from deleting the processing information under a predetermined condition.

Still another invention is a receiving device which receives data from an information processing device, the data including: processing information indicative of contents of a process to be performed by the receiving device; and flag information indicative of prohibiting the information processing device or the receiving device from deleting the processing information under a predetermined condition.

BRIEF DESCRIPTION OF THE DRAWINGS

FIG. 7 is a flowchart showing a processing procedure to be executed by the in-vehicle terminal after the power is turned on.

DETAILED DESCRIPTION OF THE PREFERRED EMBODIMENTS

Figure 1:
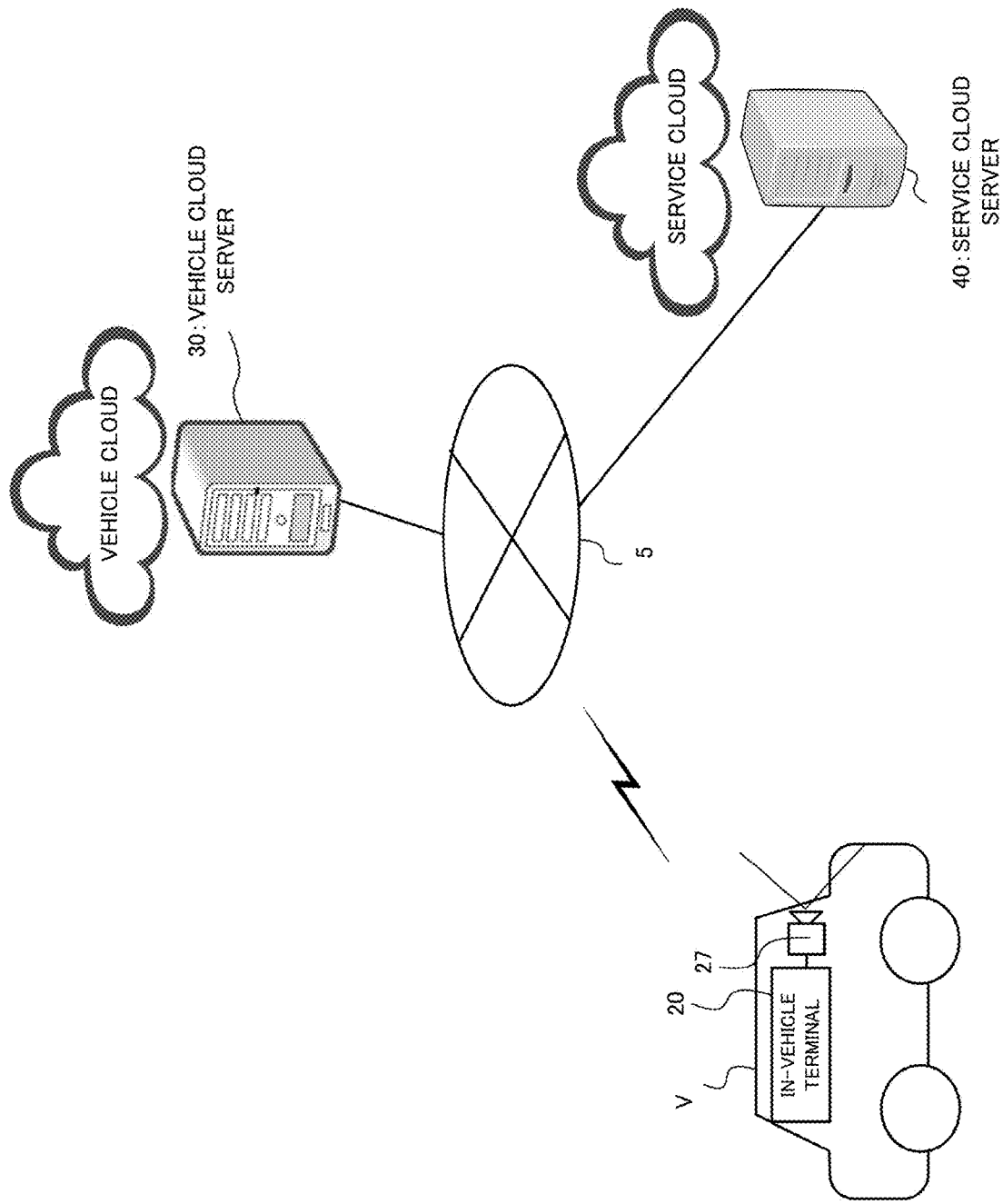
FIG. 1 is a schematic configuration of a job distribution system according to the first embodiment.

According to a preferred embodiment of the present invention, there is provided a data structure for transmission data transmitted from a first information processing device to a second information processing device, the data structure including: processing information indicative of contents of a process to be performed by the second information processing device; and flag information indicative of prohibiting the first information processing device or the second information processing device from deleting the processing information under a predetermined condition. By transmitting transmission data having such a data structure to a second information processing device, the first information processing device prevents the processing information from being erased, and therefore can let the second information processing device reliably execute the contents of the process indicated by the processing information regardless of whether or not a predetermined condition occurs.

In one mode of the data structure, the processing information and the flag information is generated by a third information processing device, and the third information processing device transmits the processing information and the flag information to the first information processing device. According to this mode, the third information processing device can suitably let the second information processing device execute the contents of the process indicated by the processing information via the first information processing device.

In another mode of the data structure, the processing information is information requesting transmission of detection information detected by a detection device. By transmitting the transmission data having such a data structure, it is possible to suitably collect the detection information detected by the detection device.

In still another mode of the data structure, the processing information includes information associated with a collection condition of the detection information detected by the detection device. By transmitting the transmission data having such a data structure, it is possible to suitably collect the detected information in a particular collection condition.

In still another mode of the data structure, the predetermined condition indicates a state where power is not supplied or a state where communication is not possible. According to this mode, even when the power is not supplied to the second information processing device or the communication becomes impossible, the processing information is suitably stored.

In still another mode of the data structure, the data structure further includes expiration date information indicative of an expiration date of the flag information, wherein the flag information indicates that the deletion is prohibited within the expiration date indicated by the expiration date information. According to this mode, it is possible to limit the period of prohibiting the erasure of the processing information to thereby prevent the processing information indicative of the content of the process that does not need to be executed from becoming unnecessarily erase prohibited. Preferably, data having these data structures is stored on a storage medium.

In another preferred embodiment, a storage device stores data transmitted from a first information processing device to a second information processing device, the data including: processing information indicative of contents of a process to be performed by the second information processing device; and flag information indicative of prohibiting the first information processing device or the second information processing device from deleting the processing information under a predetermined condition. In still another preferred embodiment, there is provided a receiving device which receives data from an information processing device, the data including: processing information indicative of contents of a process to be performed by the receiving device; and flag information indicative of prohibiting the information processing device or the receiving device from deleting the processing information under a predetermined condition.

EMBODIMENTS

A preferred embodiment of the present invention is described below with reference to drawings.

First Embodiment (1) Overall Configuration

FIG. 1 shows a schematic configuration of a job distribution system according to a first embodiment. The job distribution system is a system for collecting various information generated by sensors of a vehicle, and includes a vehicle V, a vehicle cloud server 30, and a service cloud server 40.

The in-vehicle terminal 20 is mounted on the vehicle V. The in-vehicle terminal 20 is an information processing device which is connected to various sensors for acquiring information associated with the state or the surrounding environment of the vehicle V, and which performs predetermined processing. The in-vehicle terminal 20 executes a process (simply referred to as "job") requested from the service cloud server 40 based on the output of these sensors. According to the present embodiment, the job mainly refers to the process of: acquiring, through the sensors, information which is associated with the state or the surrounding environment of the vehicle V and which is designated by the service cloud server 40; and uploading the information to the service cloud server 40.

The vehicle cloud server 30 is a server device (information processing device) constituting the vehicle cloud. The vehicle cloud is, for example, a cloud operated by an information gathering company that manages vehicles (e.g., autonomous driving vehicles) provided to the user and collects various types of information from the vehicles. An automobile manufacturer may play a role of the information gathering company and the information gathering company may be operated directly or indirectly by the automobile manufacturer. For example, when there are three companies A, B, and C as automobile manufacturers, an information collection companies operated by A, an information collection companies operated by B, and an information collection companies operated by C exist individually, and each information collection company collects various types of information from vehicles manufactured by an automobile manufacturer which operates the said each information collection company. Alternatively, it may be realized by such a form that a plurality of automobile manufacturers such as D, E, F companies are jointly commissioned/operated.

The service cloud server 40 is a server device (information processing device) constitutes a service cloud. A service cloud is, for example, a cloud operated by a service provider providing services relating to vehicles. The service providers include an insurer that provides services related to insurance, a map service company that provides services related to a map, a parking lot service company that provides services related to parking lots, and a route search service company that provides services related to route search. The service cloud server 40 generates information (also referred to as "job request") for instructing a job to be executed by the in-vehicle terminal 20 depending on the purpose, and distributes the information to the in-vehicle terminal 20 through the vehicle cloud server 30.

The in-vehicle terminal 20 mounted on the vehicle V, the vehicle cloud server 30, and the service cloud server 40 can perform wired or wireless communication to each other through the network 5. In this embodiment, the in-vehicle terminal 20, the vehicle cloud server 30, and the service cloud server 40 exchange job requests generated by the service cloud server 40 and data. (also referred to as "upload data") generated by the in-vehicle terminal 20 in response to a job request.

Figure 2:
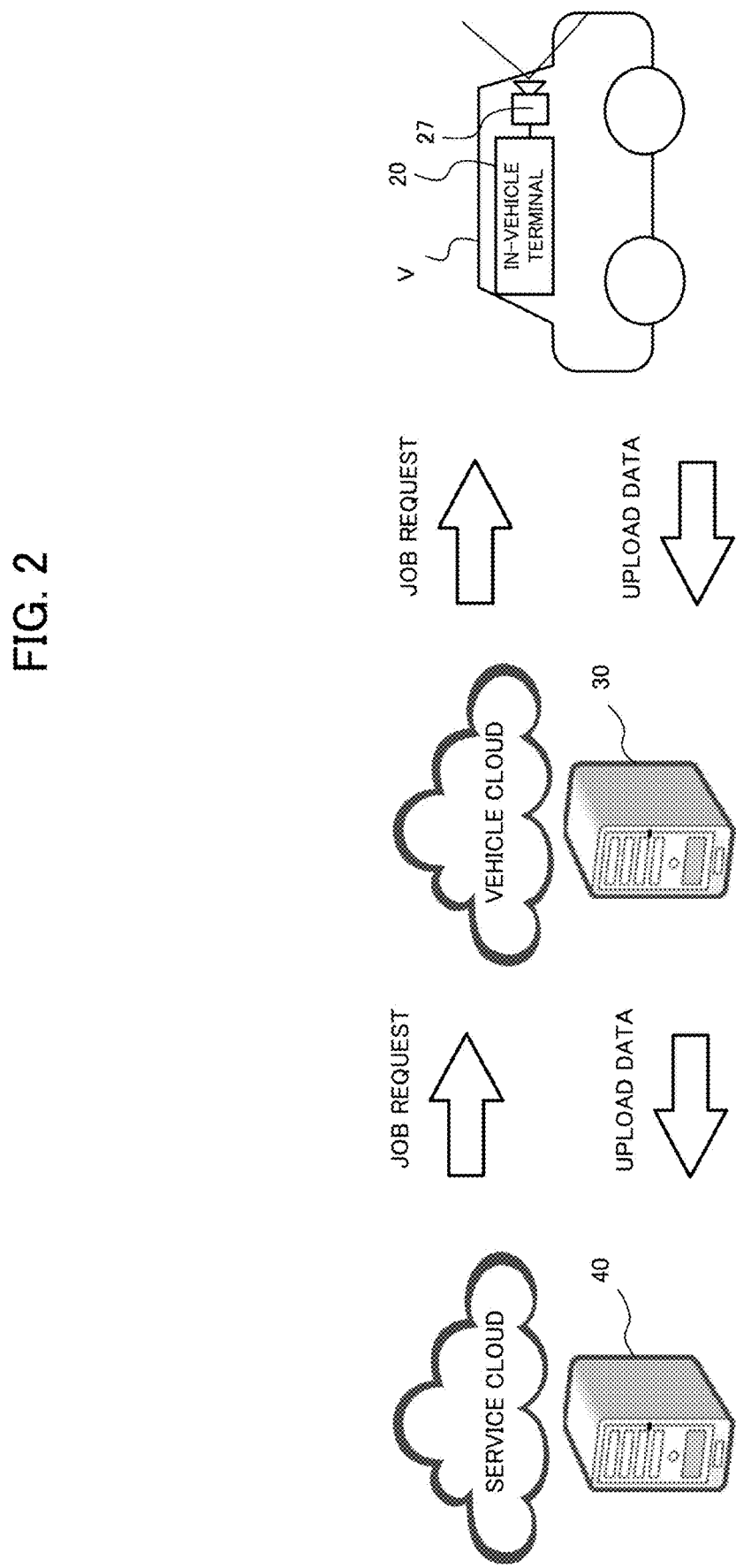
FIG. 2 is a diagram schematically showing a flow of data among an in-vehicle terminal, a vehicle cloud server and a service cloud server.

FIG. 2 is a diagram schematically illustrating a flow of data between an in-vehicle terminal 20, a vehicle cloud server 30, and a service cloud server 40. As illustrated in FIG. 2, the service cloud server 40 generates and transmits a job request to the vehicle cloud server 30, and the vehicle cloud server 30 transmits the job request received from the service cloud server 40 to the in-vehicle terminal 20. It is noted that the job request can include the vehicle ID, the driver ID, and the like identifying a vehicle which needs to execute the job, and the vehicle cloud server 30 can transmit the job request to the in-vehicle terminal 20 of the target vehicle by including the vehicle ID or the driver ID of the target vehicle in the job request as necessary. Upon receiving the job request, the in-vehicle terminal 20 collects the data specified in the job request from the sensor(s) and transmits the collected data as upload data to the vehicle cloud server 30. When receiving the upload data from the in-vehicle terminal 20, the vehicle cloud server 30 transmits the received upload data to the service cloud server 40 that issued the job request. The data structure of the job request is described in detail in the section "Data Structure".

(2) Configuration of In-Vehicle Terminal

Figure 3:
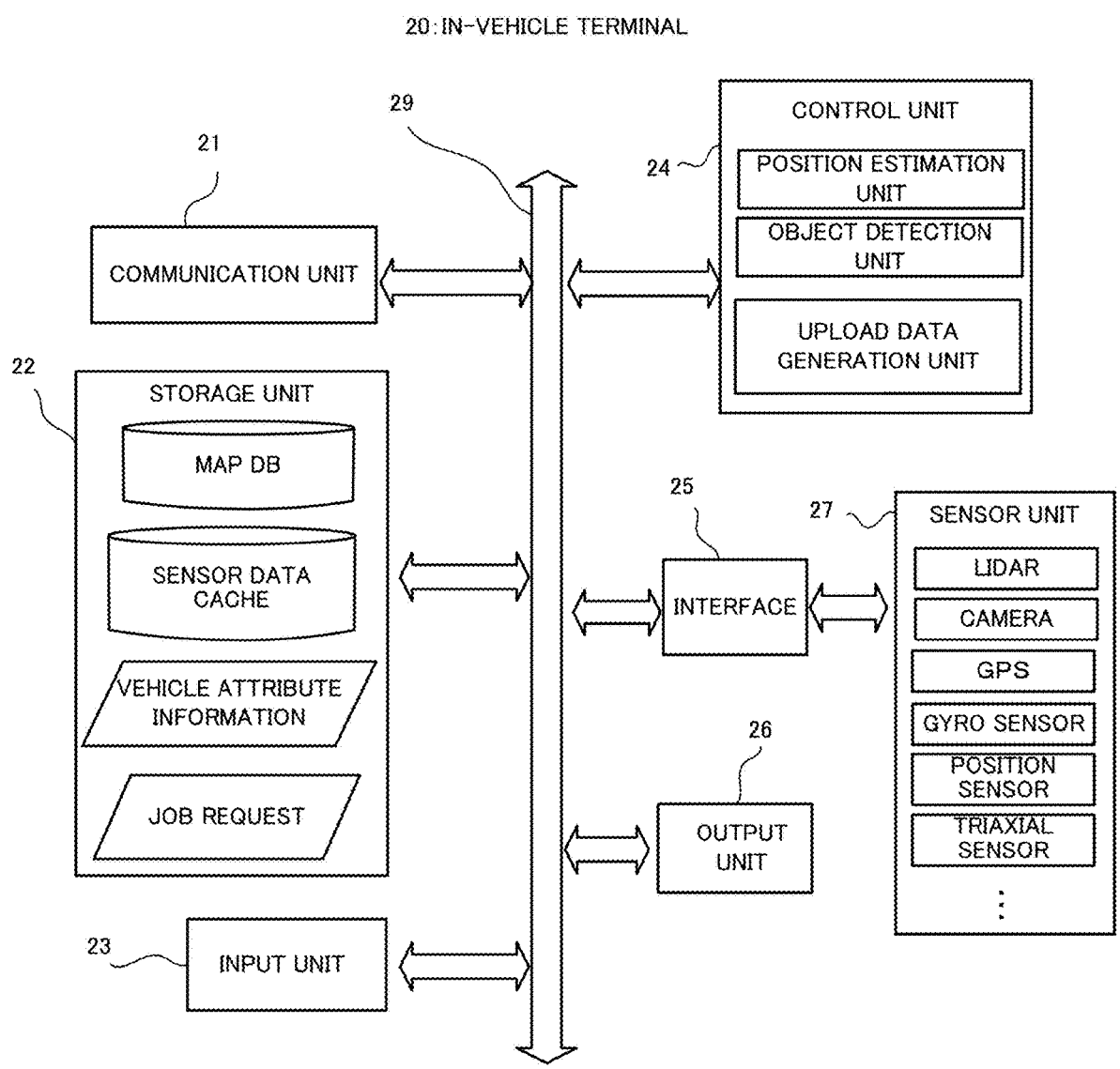
FIG. 3 is a block diagram showing an internal configuration of the in-vehicle terminal.

FIG. 3 is a block diagram showing the internal configuration of the in-vehicle terminal 20. As shown, the in-vehicle terminal 20 mainly includes a communication unit 21, a storage (memory) unit 22, an input unit 23, a control unit 24, an interface 25, and an output unit 26. Each element in the in-vehicle terminal 20 is connected to each other via a bus line 29. Further, the interface 25 is connected to the sensor unit 27.

The communication unit 21 transmits the upload data to the vehicle cloud server 30 or receives the map data for updating the map DB from the vehicle cloud server 30 under the control of the control unit 24. Further, the communication unit 21 may also perform a process of transmitting a signal for controlling the vehicle to the vehicle and a process of receiving a signal relating to the state of the vehicle from the vehicle.

The storage unit 22 stores a program the control unit 24 executes, and other information necessary for the control unit 24 to execute a predetermined process. The storage unit 22 includes a non-volatile memory (internal storage). In this embodiment, the storage unit 22 stores the map DB, the sensor data cache, and the vehicle attribute information.

The map DB is a database including, for example, road data, facility data, and feature data around the road. The road data includes roadway/lane network data for route search, road shape data, traffic regulation data. The feature data includes information relating to: signboards such as a road sign; road surface signs such as a stop line; compartment lines such as a center line; and structures along roads. Further, the feature data may include high-precision point cloud information of the feature for use in the vehicle position estimation. In addition, various data necessary for position estimation may be stored in the map DB.

The sensor data cache is a cache memory for temporarily storing the output data of the sensor unit 27. The vehicle attribute information indicates information on the attributes of the vehicle V equipped with the on-board terminal 20, such as a vehicle type, a vehicle ID, a vehicle size (e.g., vehicle length, vehicle width, vehicle size), fuel type of the vehicle and the like.

The storage unit 22 stores a job request received from the vehicle cloud server 30 through the communication unit 21. As will be described later, when a predetermined flag is included in the job request, the job request is stored in the memory area of the non-volatile memory.

The input unit 23 is a button, a touch panel, a remote controller, a voice input device, or the like for the user to operate. The input unit 23 accepts, for example, an input for specifying a destination for the route search, an input for specifying ON or OFF of the autonomous driving operation, and supplies the generated input signal to the control unit 24. The output unit 26 is, for example, a display or a speaker or the like for outputting based on the control of the control unit 24.

The interface 25 performs an interface operation for supplying the output data of the sensor unit 27 to the control unit 24 and the sensor data cache. The sensor unit 27 includes a plurality of external sensors for recognizing the peripheral environment of the vehicle such as a lidar and a camera, and also includes a plurality of internal field sensors such as a GPS receiver, a gyro sensor, a position sensor, a triaxial sensor. The lidar discretely measures the distance to an object existing in the outside world, recognizes the surface of the object as a three-dimensional point cloud, and generates point cloud data. The camera generates image data taken from the vehicle. The position sensor is provided to detect the position of each external sensor, and the three-axis sensor is provided to detect the posture of each external sensor. The sensor unit 27 may include an external sensor and an internal sensor other than the external sensor and the internal sensor shown in FIG. 3. For example, the sensor unit 27 may include an ultrasonic sensor, an infrared sensor, a microphone, or the like as an external sensor. The sensor unit 27 is an example of a detection device.

The control unit 24 includes a CPU or the like for executing a predetermined program on one or more platforms, and controls the entire in-vehicle terminal 20. The control unit 24 functionally includes a position estimation unit, an object detection unit, and an upload data generation unit. The control unit 24 functions as a computer for executing a program.

The position estimating unit estimates the position of the own vehicle (including the posture of the vehicle) based on the map DB and the output data of the sensor unit 27 stored in the sensor data cache. The position estimating unit is capable of performing various position estimation methods. For example, the position estimating unit executes: an own vehicle position estimation method by dead reckoning (autonomous navigation) based on the output of the autonomous positioning sensor such as a GPS receiver and a gyro sensor; an own-vehicle position estimation method by further collating (map matching) the road data of the map DB to the autonomous navigation result; and an own-vehicle position estimation method based on the output data of the external sensor such as a lidar or a camera and the position information in the feature information included in the map DB with respect to a predetermined object (landmark) existing in the circumferences. Then, the position estimating unit executes the position estimation method with the highest estimation accuracy among the currently executable position estimation methods, and supplies the vehicle position information indicative of the vehicle position or the like obtained based on the executed position estimation method to the upload data generating unit.

The object detecting unit detects a predetermined object based on point cloud information, image data, voice data, and the like output by the sensor unit 27. In this case, for example, the object detecting unit extracts feature data corresponding to the object detected by the sensor unit 27 from the map DB based on the position of the vehicle estimated by the position estimating unit. Then, the object detecting unit supplies information associated with the object detected by the sensor unit 27 to the upload data generating unit in such a case, for example, that there is a difference between the position and the shape of the object detected by the sensor unit 27 and the position and the shape of the object indicated by the feature data extracted from the map DE, or that there is no corresponding feature data in the map DE.

The upload data generating unit generates upload data based on the own vehicle position information supplied from the position estimating unit, the object data supplied from the object detecting unit, and the output data of the sensor unit 27 supplied from the sensor data cache. In this example, the upload data generating unit generates data designated by the job request as upload data when the condition specified by the job request stored in the storage unit 22 is satisfied. The upload data generating unit transmits the generated upload data to the vehicle cloud server 30 through the communication unit 21.

(3) Configuration of the Vehicle Cloud Server

Figure 4A:
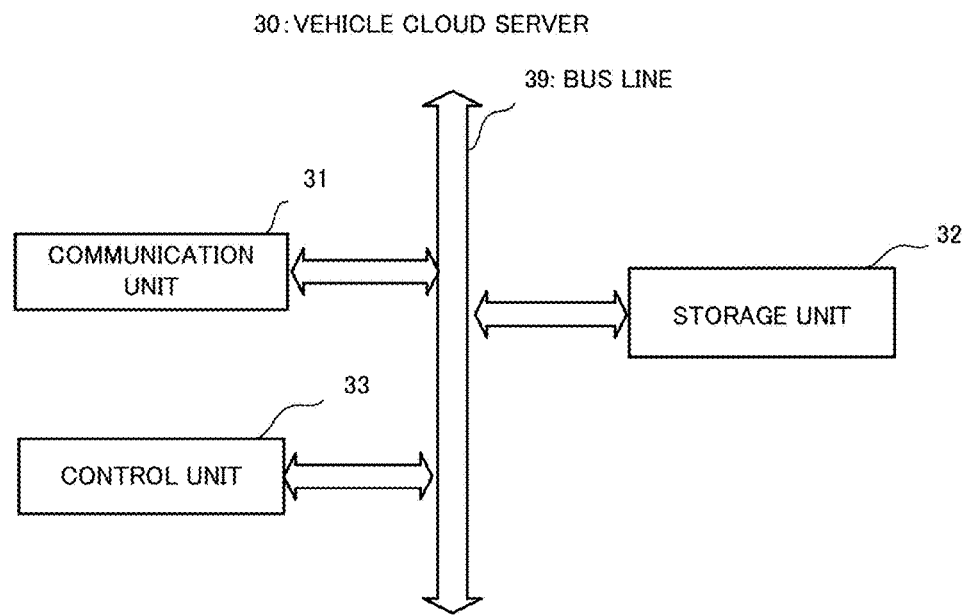
FIGS. 4A and 4B are block diagrams showing the internal configuration of the vehicle cloud server and the service cloud server.

Next, the vehicle cloud server 30 will be described in detail. FIG. 4A is a block diagram showing the internal configuration of the vehicle cloud server 30. As shown, the vehicle cloud server 30 includes a communication unit 31, a storage (memory) unit 32, and a control unit 33. Each element in the vehicle cloud server 30 is interconnected via a bus line 39.

The communication unit 31 communicates with the in-vehicle terminal 20 and the service cloud server 40 of the vehicle V based on the control of the control unit 33. Specifically, the communication unit 31 receives a job request from the service cloud server 40 or transmits the job request to the in-vehicle terminal 20. Further, the communication unit 31 receives upload data from the in-vehicle terminal 20 or transmits the upload data to the service cloud server 40.

The storage unit 32 includes a ROM, a RAM, and the like, and stores programs for various kinds of processing executed by the vehicle cloud server 30. The storage unit 32 is also used as a work memory when various kinds of processing are executed. The storage unit 32 stores a table which associates the vehicle ID or/and the driver ID for each vehicle with the communication address information for transmitting data to the in-vehicle terminal 20 of the corresponding vehicle.

The storage unit 32 may store history data of a job request received from the service cloud server 40 by the vehicle cloud server 30 and upload data acquired from the in-vehicle terminal 20 by the vehicle cloud server 30. In this case, for example, on the storage unit 32, the upload data received from each of the in-vehicle terminals 20 is stored in association with the reception time and the vehicle ID of the vehicle V equipped with the in-vehicle terminal 20. Similarly, on the storage unit 32, a job request received from the service cloud server 40 may be stored in association with a reception time, information identifying the service cloud server 40 as the source of the transmission and the like.

The control unit 33 includes a computer such as a CPU and controls the entire vehicle cloud server 30. Specifically, the control unit 33 performs various processes by executing various programs stored in the storage unit 32.

(4) Configuration of Service Cloud Server

Figure 4B:
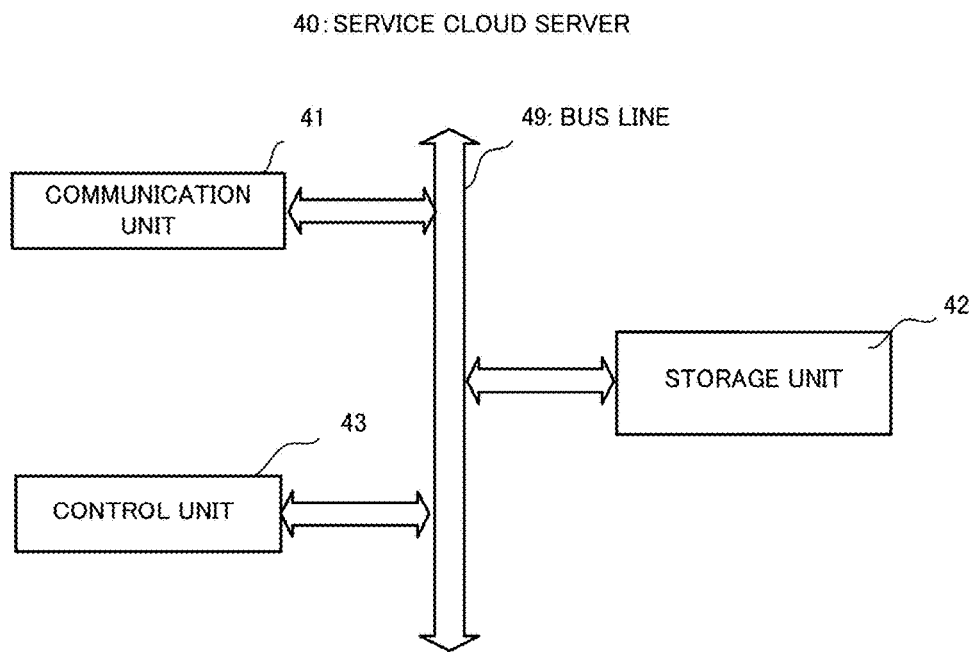

Next, the service cloud server 40 will be described in detail. FIG. 4B is a block diagram illustrating an internal configuration of the service cloud server 40. As shown, the service cloud server 40 includes a communication unit 41, a storage (memory) unit 42, and a control unit 43. Each element in the service cloud server 40 is interconnected via a bus line 49.

The communication unit 41 communicates with the vehicle cloud server 30 under the control of the control unit 43. Specifically, the communication unit 41 receives, from the vehicle cloud server 30, information corresponding to provision information to be described later.

The storage unit 42 includes a non-volatile memory such as a ROM, and a volatile memory such as a RAM, and stores programs for various kinds of processing executed by the service cloud server 40. The storage unit 42 is also used as a work memory when various kinds of processing are executed. The storage unit 42 may store a history of a job request transmitted by the service cloud server 40 to the vehicle cloud server 30 and upload data which the service cloud server 40 acquires from the vehicle cloud server 30. In this case, for example, the job request and the upload data are stored on the storage unit 42 in association with the transmission and reception time and information identifying the vehicle cloud server 30 that corresponds to the transmission destination or the source of the transmission source.

The control unit 43 includes a computer such as a CPU and controls the entire service cloud server 40. Specifically, the control unit 43 performs various processes by executing various programs stored on the storage unit 42.

(5) Data Structure of Job Request

Figure 5:
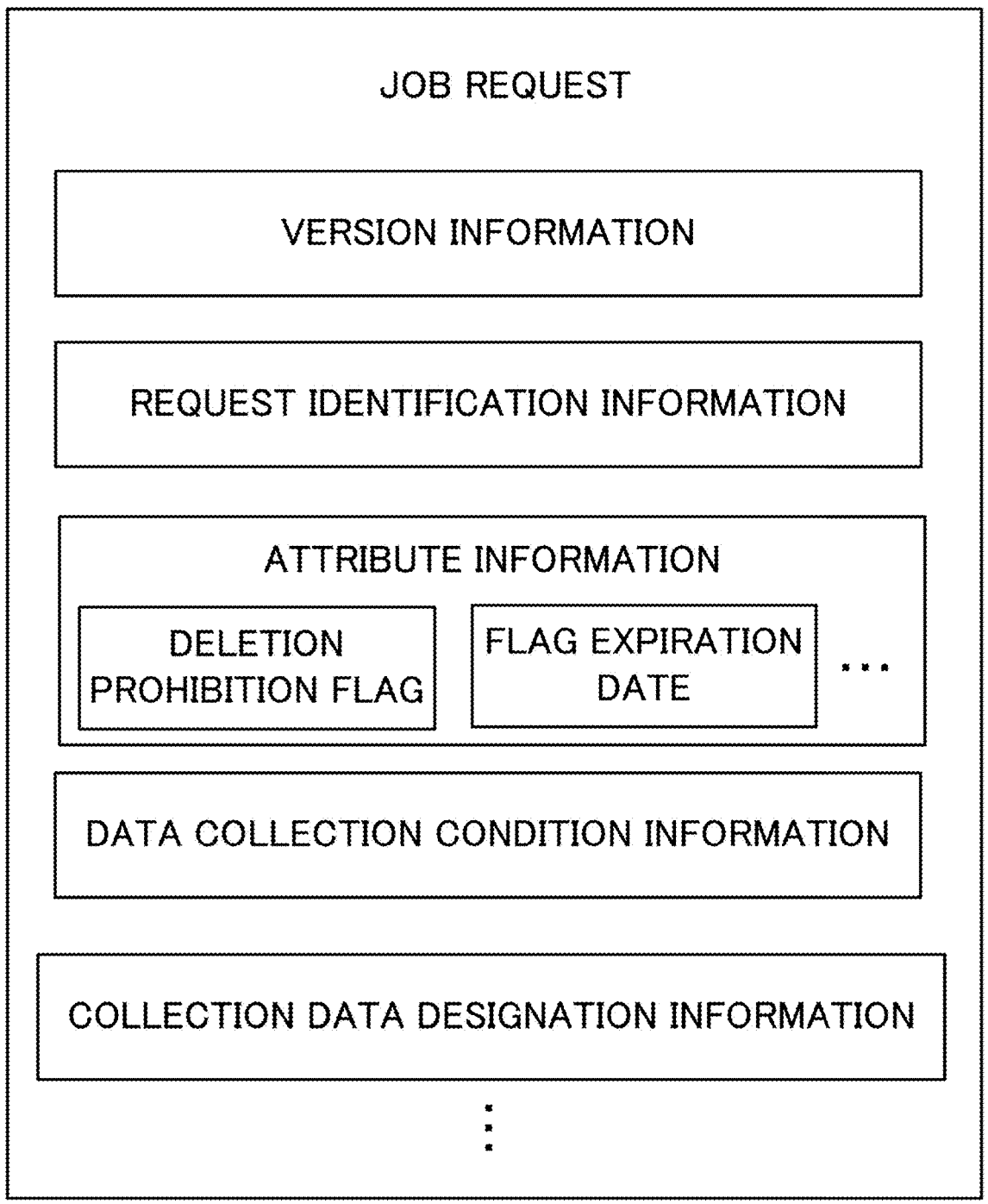
FIG. 5 is an example of the data structure of a job request.

FIG. 5 is an example of a data structure of a job request. As illustrated, the job request includes "version information", "request identification information", "attribute information", "data collection condition information" and "collection data designation information".

The "version information" is information that identifies the version or the like of the specification that defines the job request. The "request identification information" is identification information unique to the target job request. Thus, each time the service cloud server 40 generates a job request, it generates unique request identification information and includes it in the job request. The request identification information is also included in the upload data generated based on the job request.

The "attribute information" is information that specifies the handling of the target job request. In this embodiment, as the "attribute ins formation", the "deletion prohibition flag" and the "flag expiration date" can be specified.

The "deletion prohibition flag" is a flag for prohibiting deletion of the target job request. When the job request includes the deletion prohibition flag, the in-vehicle terminal 20 stores the job request in the non-volatile memory so that the job request is not deleted under a predetermined condition such as power off. The deletion prohibition flag is an example of flag information.

The "flag expiration date" indicates the expiration date (validity period) of the "deletion prohibition flag" recorded as "attribute information". In such a case that the flag expiration date is included in the job request together with the deletion prohibition flag, the in-vehicle terminal 20 considers the deletion prohibition flag to be valid only within the period indicated by the flag expiration date and then stores the job request in the non-volatile memory at least within the period to prevent the job request from being deleted under predetermined conditions such as power off. It is noted that the in-vehicle terminal 20 may delete the job request including the deletion prohibition flag that already expired on the flag expiration date from the nonvolatile memory. The flag expiration date is an example of expiration date information.

The "data collection condition information" is information indicating the condition for collecting data. Examples of the "data collection condition information" include: information indicative of geographical conditions under which the in-vehicle terminal 20 generates upload data; temporal conditions for generating upload data; events; vehicle ID of the vehicle V; and driver ID of the vehicle V. Here, one of the geographical conditions for generating the upload data described above is, for example, a condition for specifying a road or an area for generating the upload data, and the one of the temporal conditions for generating the upload data is, for example, a condition for specifying a temporal constraint such as a time slot or an interval for generating the upload data. Further, the above-mentioned event indicates an event or the like that triggers the generation of upload data. For example, the occurrence of a predetermined degree or more of impact (i.e., accident) or sudden braking is specified as the event described above.

The "collection data designation information" is information specifying the data to be included as upload data when the conditions indicated by the data collection condition information are satisfied. Examples of the collection data designation information include information on the acceleration and deceleration of the vehicle, information on the vehicle speed, information on the vehicle travel locus (i.e., the vehicle position in the time series), information on the departure point and the destination, and image information captured by camera in a predetermined time period before and after the occurrence of the accident. The contents designated as the data collection condition information and the collection data designation information depend on the service company operated by the service cloud server 40 that generates the job request. The data collection condition information and collection data designation information are examples of processing information.

It is noted that the job request may include any information other than the information shown in FIG. 5. For example, the job request may include address information specifying a destination for transmitting upload data to the service cloud server 40 that is the source of the job request.

Here, a supplementary description will be given of the action and effect of providing the deletion prohibition flag in the job request.

In general, when the job request is stored in the volatile memory, the job request is erased when the power of the in-vehicle terminal 20 is turned off in response to the switching to the ignition off or the accessory position (Acc) off. On the other hand, in the present embodiment, when the job request includes the deletion prohibition flag, the job request is reliably stored in the non-volatile memory. Thus, even if the power of the in-vehicle terminal 20 is turned off due to the ignition off or the like, the job request is not deleted. Therefore, the job request can be preferably referred to by the in-vehicle terminal 20 when the power of the in-vehicle terminal 20 is turned on again by the ignition on or the like, and therefore the in-vehicle terminal 20 can execute the specified job with reference to the job request even after restarting.

Next, a specific example of generating a job request including a deletion prohibition flag will be described.

For example, an insurer providing a service for automobile insurances may want to know, for the purpose of calculating the premiums, which route each individual vehicle or individual driver passes through and what driving operations (acceleration, deceleration, etc.) it is doing. In such a case, the service cloud server 40 operated by the insurer generates and distributes job requests each of which includes, in association with the vehicle ID or/and the driver ID, instruction information to instruct collection of data such as running trajectory and acceleration. Such a job request is information that the insurer does not want to discard at least during the period (terms) of the insurance. In such a case, the service cloud server 40 generates and distributes a job request including a deletion prohibition flag and a flag expiration date specifying a period equal to the period of the insurance. This allows the service cloud server 40 during the policy period to suitably acquire upload data which includes information necessary to calculate premiums regarding the target vehicle ID or/and driver ID.

(6) Process Based on Job Request

Figure 6:
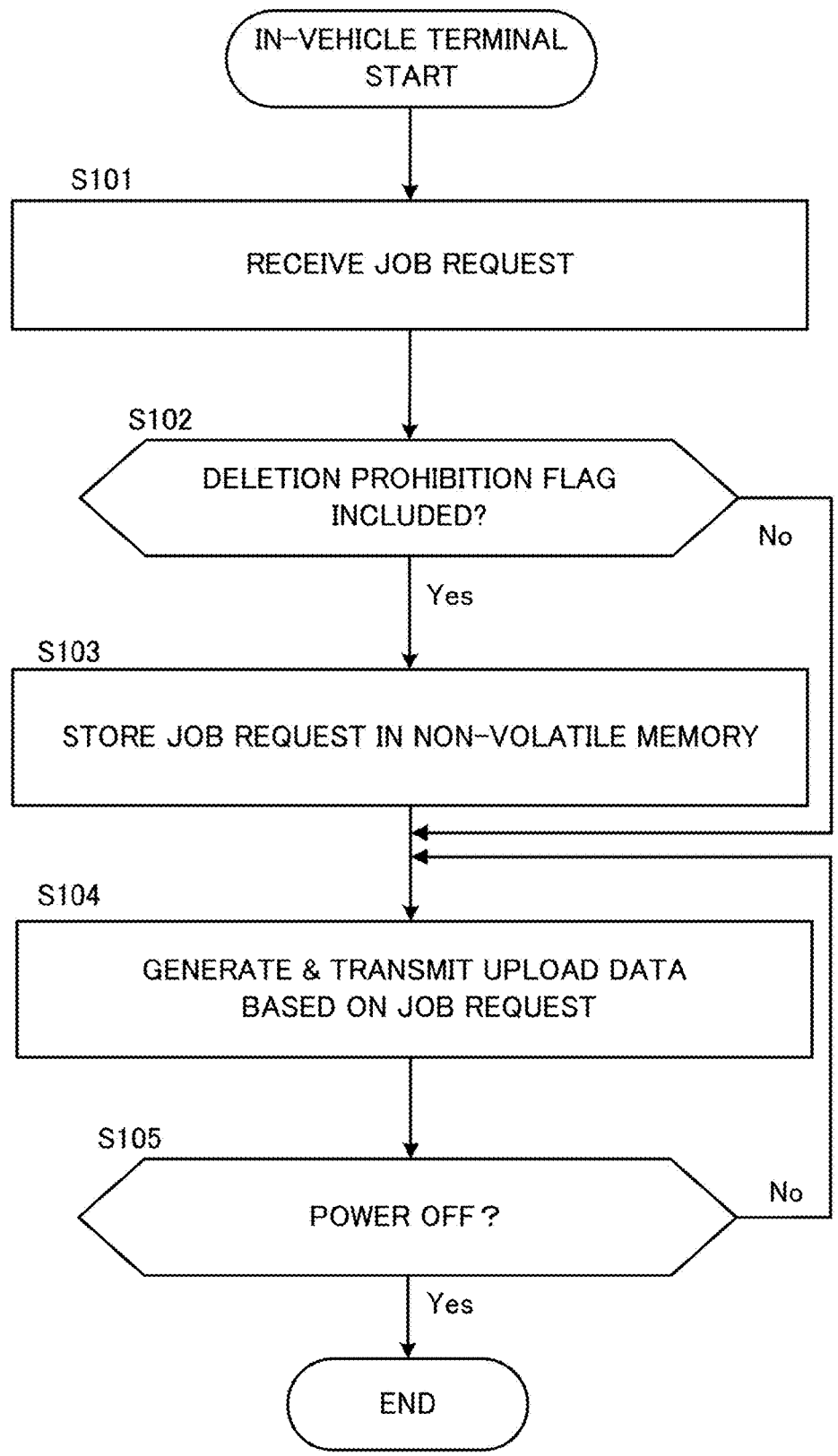
FIG. 6 is a flowchart showing a processing procedure to be executed by the in-vehicle terminal after the in-vehicle terminal receives the job request until the power is turned off.

Here, the process performed by the in-vehicle terminal 20 that has received the job request will be described with reference to FIGS. 6 and 7. FIG. 6 is a flowchart illustrating a processing procedure to be executed by the in-vehicle terminal 20 during the time period from receiving the job request until the power is turned off.

First, the in-vehicle terminal 20 receives a job request from the vehicle cloud server 30 (step S101). Then, the in-vehicle terminal 20 determines whether or not the deletion prohibition flag is included in the received job request (step S102). When determining that the job request includes the deletion prohibition flag (step S102; Yes), the in-vehicle terminal 20 stores the job request in the non-volatile memory (step S103). The memory area of the non-volatile memory in which the job request is stored is, for example, an area in which automatic overwriting by other information is prohibited, and even in any of these cases that the power is turned off, that the communication connection (session) with the vehicle cloud server 30 is disconnected, and that the processing load is increased, the job request is not automatically deleted. Thus, the in-vehicle terminal 20 can suitably manage to refer to the job request at any timing.

On the other hand, when determining that the job request does not include the deletion prohibition flag (step S102; No), the in-vehicle terminal 20 advances the process to step S104. In this case, the in-vehicle terminal 20 temporarily stores the job request in the volatile memory for executing the job, for example. In another example, the in-vehicle terminal 20 may store the job request in the memory area of the non-volatile memory that is automatically erased under a predetermined condition. The predetermined condition described above may be satisfied, for example, when the communication connection with the vehicle cloud server 30 is disconnected, when the processing load increases to a threshold, or when other information is newly stored.

Next, the in-vehicle terminal 20 generates the upload data based on the job request received at the step S101, and transmits the generated upload data to the vehicle cloud server 30 that is the source of the transmission of the job request (step S104). In this case, the in-vehicle terminal 20 refers to the data collection condition information included in the job request, and when it is determined that the condition indicated by the information is satisfied, acquires, through the sensor unit 27, data indicated by the collection data designation information included in the job request to generate and transmit the data as upload data.

Then, the in-vehicle terminal 20 determines whether or not a power-off command is generated in response to a predetermined operation or the like such as ignition-off for the vehicle V (step S105). Then, when the command of the power-off occurs (step S105; Yes), the in-vehicle terminal 20 ends the process of the flowchart. On the other hand, when there is no power-off command (Step S105; No), the in-vehicle terminal 20 continues to generate and transmit upload data based on the job request at the step S104.

Figure 7:
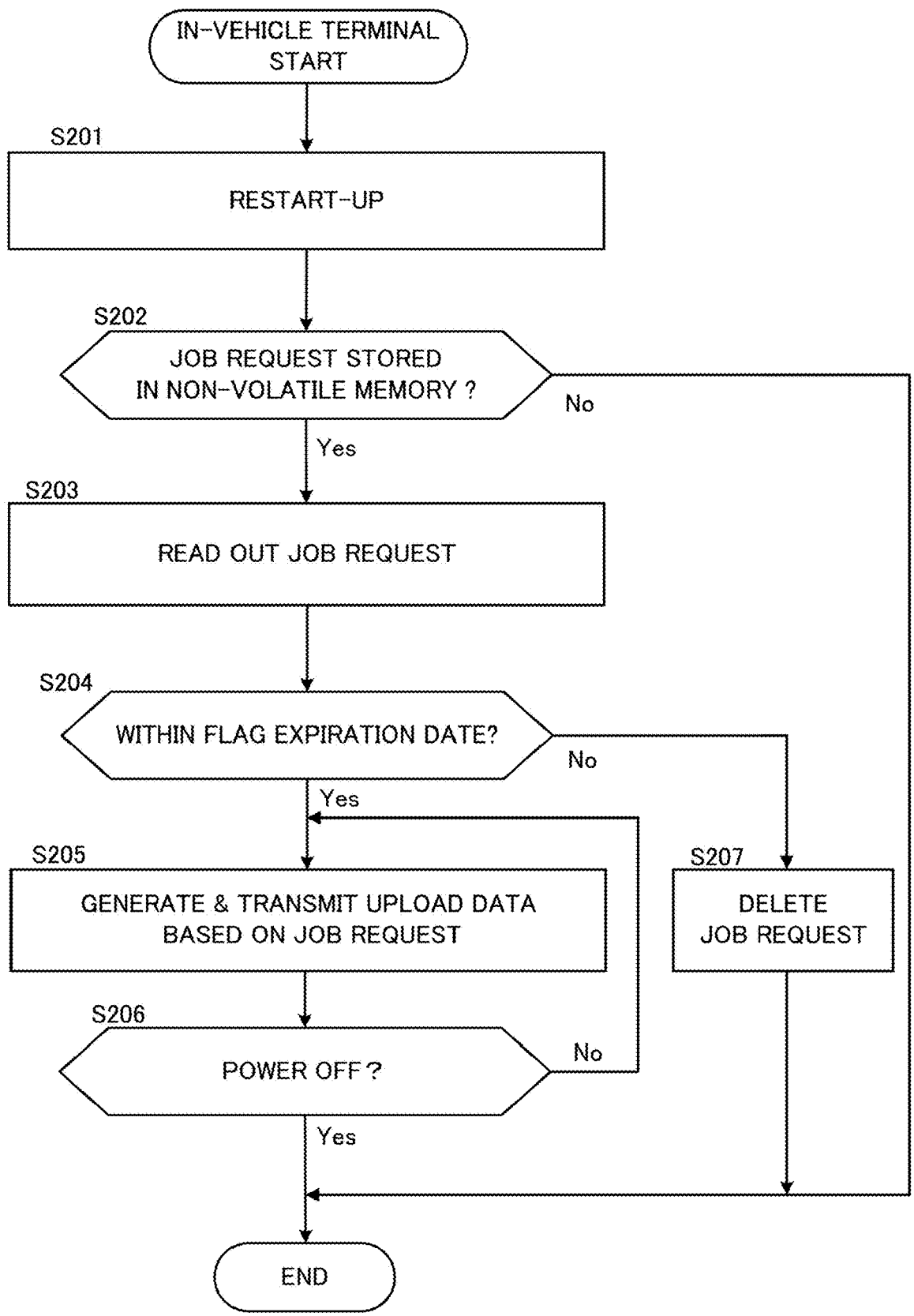

FIG. 7 is a flowchart showing a processing procedure in which the in-vehicle terminal 20 executes after the power is turned on.

First, the in-vehicle terminal 20 restarts in response to the power of the in-vehicle terminal 20 being turned on due to a predetermined operation such as ignition-on (step S201). In this case, the in-vehicle terminal 20 determines whether or not the job request is stored in the memory area of the non-volatile memory for storing the job rem quest including the deletion prohibition flag (step S202). When the job request is stored in the memory area of the non-volatile memory (Step S202; Yes), the in-vehicle terminal 20 reads out the job request to refer to the job request (Step S203). On the other hand, when the job request is not stored in the memory area of the non-volatile memory (step S202; No), the in-vehicle terminal 20 determines that there is no job to be executed and terminates the process of the flowchart.

Next, the in-vehicle terminal 20 determines, based on the job request read in step S203, whether or not the deletion prohibition flag is within the expiration date (step S204). For example, the in-vehicle terminal 20 determines that the deletion prohibition flag is within the expiration date (validity period) when the current date and time are within the period indicated by the flag expiration date included in the job request or when the flag expiration date is not included in the job request.

When the deletion prohibition flag is within the expiration date (Step S204: Yes), the in-vehicle terminal 20 determines that the job request read at the step S203 is valid, and, as with the step S104 of FIG. 6, generates and transmits the upload data based on the job request (Step S205). Then, when the command of the power-off occurs (step S206; Yes), the in-vehicle terminal 20 ends the process of the flowchart. On the other hand, when there is no power-off command (Step S206; No), the in-vehicle terminal 20 continuously generates and transmits a job request based on the job request at the step S205.

On the other hand, when the deletion prohibition flag is not within the expiration date (step S204; No), the in-vehicle terminal 20 deletes the job request including the deletion prohibition flag from the nonvolatile memory (step S207). Thus, the in-vehicle terminal 20 suitably suppresses the state in which the unnecessary job request is stored in the non-volatile memory from continuing.

As described above, the job request according to the first embodiment is transmission data transmitted from the vehicle cloud server 30 to the in-vehicle terminal 20 and includes at least: data collection condition information and collection data designation information indicative of contents of a process to be performed by the in-vehicle terminal 20; and deletion prohibition flag indicative of prohibiting the in-vehicle terminal 20 from deleting the job request under a predetermined condition. According to this data structure, the job request is suitably stored by the in-vehicle terminal 20 even under a predetermined condition such as power off, and the vehicle cloud server 30 does not need such a process that continues to issue a job request to the in-vehicle terminal 20 in consideration of the possibility that the in-vehicle terminal 20 deletes the job request.

As described above, the in-vehicle terminal 20 according to the first embodiment is an information processing device that executes processing based on a job request received from the vehicle cloud server 30, and receives a job request indicative of contents of the process to be executed from the vehicle cloud server 30. When the job request includes a deletion prohibition flag indicative of prohibiting the deletion of the job request, the in-vehicle terminal 20 writes the job request to a storage unit that does not delete stored information under a predetermined condition. Accordingly, the in-vehicle terminal 20 can suitably manage the job request and reliably perform the process based on the job request.

Second Example

The second embodiment is different from the first embodiment in that the vehicle cloud server 30, instead of the in-vehicle terminal 20, stores a job request including a deletion prohibition flag in its non-volatile memory to transmit the job request to the in-vehicle terminal 20 at the time of the startup of the system of the in-vehicle terminal 20. The configuration of the job distribution system shown in FIG. 1, the data flow of the job request and the upload data shown in FIG. 2, the configuration of the in-vehicle terminal 20 shown in FIG. 3, the configuration of the vehicle cloud server 30 shown in FIG. 4A and the configuration of the service cloud server 40 shown in FIG. 4B, and the data structure of the job request shown in FIG. 5 are the same as those of the first embodiment, and thus description thereof will be omitted.

Figure 8:
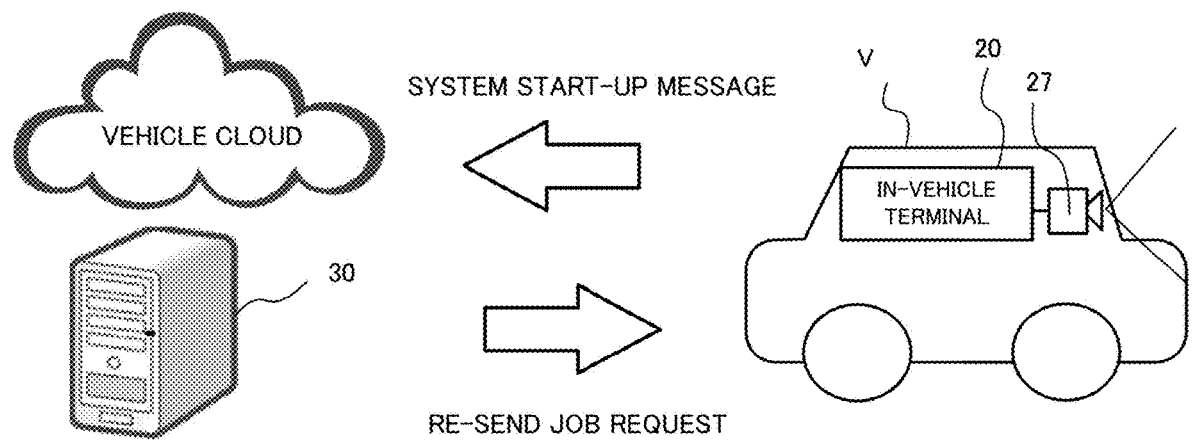
FIG. 8 is a diagram showing an outline of data transmission and reception between the vehicle cloud and the in-vehicle terminal at the time of startup of the in-vehicle terminal according to the second embodiment.

FIG. 8 is a diagram illustrating an outline of data transmission and reception between the vehicle cloud server 30 and the in-vehicle terminal 20 at the time of restart-up of the in-vehicle terminal 20 according to the second embodiment.

After the power is turned on and the in-vehicle terminal 20 is activated, the in-vehicle terminal 20 transmits information (also referred to as a "system start-up message") for informing the vehicle cloud server 30 of the start-up of the system in the vehicle V. Incidentally, the system start message includes, for example, a vehicle ID and a driver ID of the vehicle V.

Alternatively, the in-vehicle terminal 20 may transmit information (also referred to as "job disappearance message") informing the vehicle cloud server 30 that the job request including the deletion prohibition flag inside the terminal has been deleted. Incidentally, the job disappearance message includes, for example, a vehicle ID or a driver ID of the vehicle V.

Here, among job requests received from the service cloud server 40 and transmitted to the in-vehicle terminal 20, the vehicle cloud server 30 stores job request (s) including the deletion prohibition flag in the non-volatile memory in which the automatic deletion of the information does not occur. Then, when the vehicle cloud server 30 receives a system start-up message from the in-vehicle terminal 20, it searches for the job request that includes the vehicle ID or/and driver ID included in the system start-up message among the job request(s) stored in the non-volatile memory.

When there is a target job request of the search, the vehicle cloud server 30 resends the job request to the in-vehicle terminal 20. When receiving a job disappearance message from the in-vehicle terminal 20, the vehicle cloud server 30 searches for a job request including the vehicle ID or/and the driver ID included in the job disappearance message among the job request(s) stored in the non-volatile memory. When there is a target job request of the search, the vehicle cloud server 30 deletes the job request from the non-volatile memory.

According to this aspect, the in-vehicle terminal 20 can suitably re-acquire a job request indicative of a job to be executed at the start-up timing even when the received job request is lost at the timing, for example, when the power supply is turned off. Therefore, according to the second embodiment, the in-vehicle terminal 20 does not need to store (hold) the job request in its own terminal and does not need to include a non-volatile memory for storing the job request. The system start-up message (or job disappearance message) is an example of status information. Further, the control unit 34 of the vehicle cloud server 30 is an example of a computer that executes a program.

Figure 9:
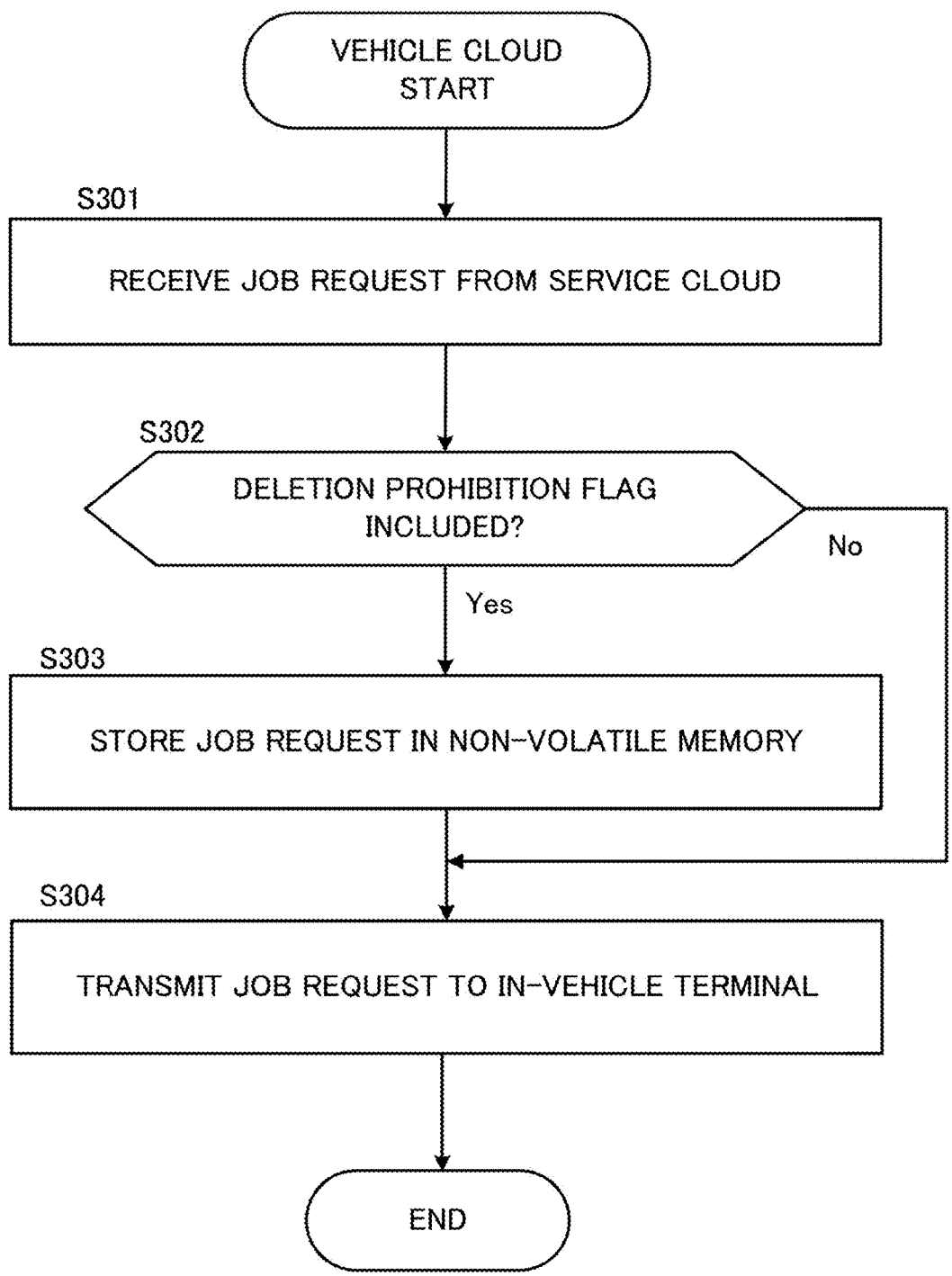
FIG. 9 is a flowchart illustrating a processing procedure to be executed by the vehicle cloud according to the second embodiment when the vehicle cloud receives a job request from the service cloud.

FIG. 9 is a flowchart illustrating a processing procedure to be executed when the vehicle cloud server 30 receives a job request from the service cloud server 40 according to the second embodiment.

First, the vehicle cloud server 30 receives a job request from the service cloud server 40 (step S301). The vehicle cloud server 30 determines whether or not the job request received at the step S301 includes the deletion prohibition flag (step S302). When the job request includes the deletion prohibition flag (Step S302; Yes), the vehicle cloud server 30 stores the job request in the nonvolatile memory of the storage unit 32 (Step S303). The memory area of the non-volatile memory in which the job request is stored is, for example, an area in which automatic overwriting by other information is prohibited, and therefore the job request is not automatically deleted even when the communication connection (session) with the target in-vehicle terminal 20 is disconnected or when the processing load increases. Then, the vehicle cloud server 30 transmits the job request stored in the nonvolatile memory to the in-vehicle terminal 20 corresponding to the vehicle ID or the driver ID specified in the job request (step S304).

On the other hand, when the deletion prohibition flag is not included in the job request (step S302; No), the vehicle cloud server 30 transmits the job request to the in-vehicle terminal 20 (step S304). In this instance, the vehicle cloud server 30 may store the job request in either volatile memory or non-volatile memory, and may erase the job request after completing the transmission process at the step S304.

Figure 10:
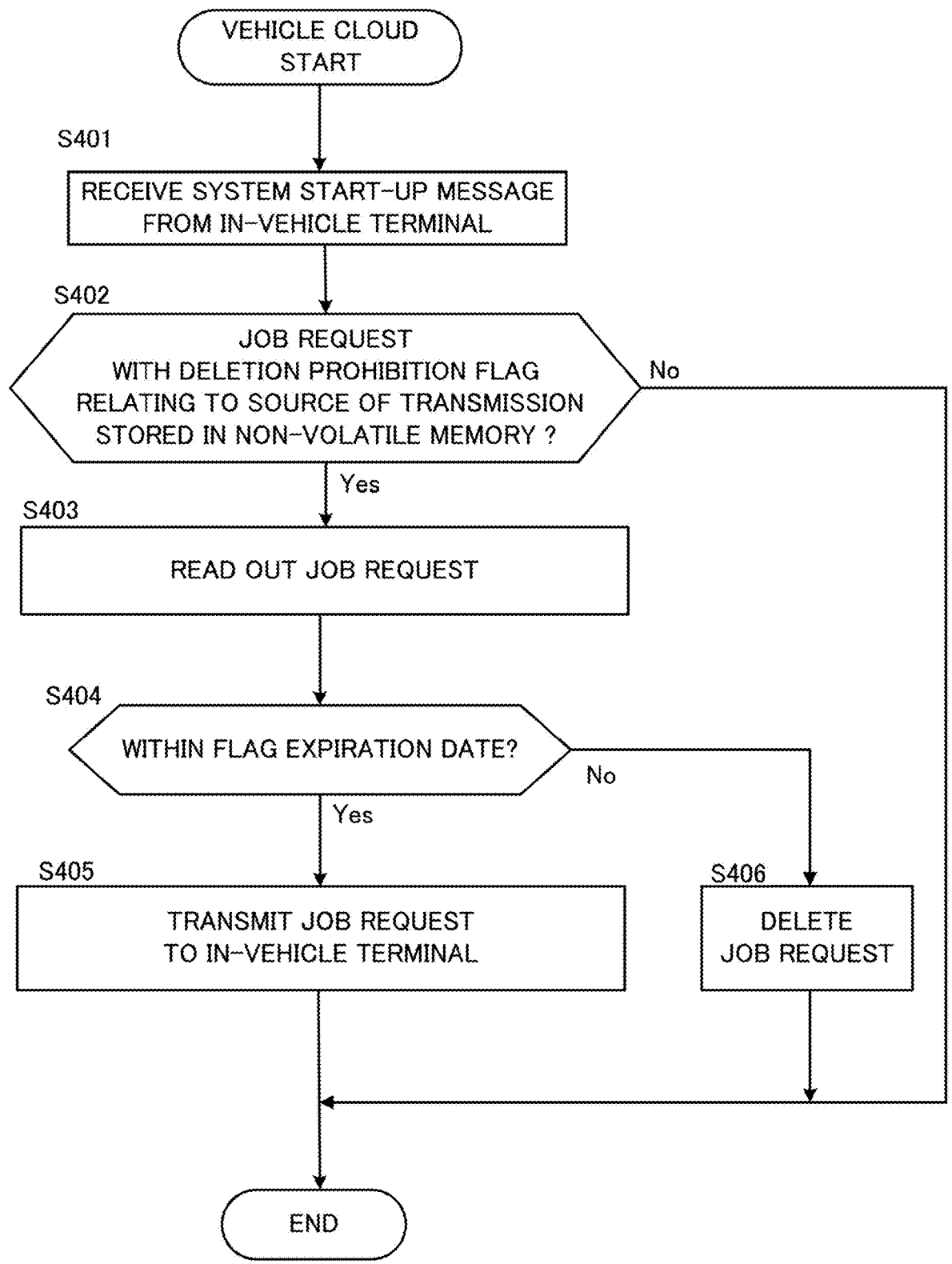
FIG. 10 is a flowchart illustrating a processing procedure performed by the vehicle cloud when the vehicle cloud receives the system startup message in the second embodiment.

FIG. 10 is a flowchart illustrating a processing procedure executed by the vehicle cloud server 30 that has received the system start-up message according to the second embodiment.

The vehicle cloud server 30 receives a system start-up message from the in-vehicle terminal 20 of the vehicle activated in response to the ignition-on or the like (step S401). In this case, the vehicle cloud server 30 determines whether or not the job request with the deletion prohibition flag including the vehicle ID or the driver ID of the vehicle that is the source of the system startup message is stored in the non-volatile memory (step S402). When the target job request is stored in the non-volatile memory (Step S402; Yes), the vehicle cloud server 30 reads out the target job request (Step S403).

The vehicle cloud server 30 determines whether or not the deletion prohibition flag is within the expiration date based on the job request read out at the step S403 (step S404). When the deletion prohibition flag is within the expiration date (step S404; Yes), the in-vehicle terminal 20 determines that the job request read out at the step S403 is valid and transmits the job request to the in-vehicle terminal 20 that is the source of the system start-up message (step S405). Accordingly, the vehicle cloud server 30 can suitably let the in-vehicle terminal 20 to which the job request is transmitted generate and transmit upload data based on the job request.

Meanwhile, when the deletion prohibition flag is not within the expiration date (step S404; No), the vehicle cloud server 30 deletes (erases) the job request with the deletion prohibition flag from the non-volatile memory (step S406). Thus, the vehicle cloud server 30 suitably suppresses the continuation of such a state that unnecessary job requests are stored in the non-volatile memory.

As described above, the job request according to the second embodiment is transmission data transmitted from the vehicle cloud server 30 to the in-vehicle terminal 20 and includes at least: data collection condition information and collection data designation information indicative of contents of a process to be performed by the in-vehicle terminal 20; and deletion prohibition flag indicative of prohibiting the vehicle cloud server 30 from deleting the job request under a predetermined condition. According to this data structure, the job request is suitably stored by the vehicle cloud server 30 and the in-vehicle terminal 20 can suitably execute the process requested from the service cloud server 40 by receiving the job request from the vehicle cloud server 30.

As described above, the vehicle cloud server 30 according to the second embodiment stores a job request including: data collection condition information and collection data designation information indicative of contents of a process to be performed by the in-vehicle terminal 20; and deletion prohibition flag indicative of prohibiting deleting the job request under a predetermined condition. Then, the vehicle cloud server 30 receives the system start-up message, which is an example of state information indicative of the state of the in-vehicle terminal 20, from the in-vehicle terminal 20. Then, when the vehicle cloud server 30 receives the system start-up message, it transmits the above-described job request to the in-vehicle terminal 20. Thus, even after restarting, the in-vehicle terminal 20 can suitably continue the process requested from the service cloud server 40.

<Modification>

Next, a description will be given of a preferred modification to the first embodiment and the second embodiment described above.

(First Modification)

The function corresponding to the in-vehicle terminal 20 may be incorporated in the vehicle V. In this case, by executing a program stored in the memory of the vehicle, the electronic control unit (ECU: Electronic Control Unit) of the vehicle executes a process corresponding to the control unit 24 of the in-vehicle terminal 20. In this case, the electronic controller of the vehicle is an example of an information processing device.

(Second Modification)

In the first embodiment, the in-vehicle terminal 20 may store a job request with a deletion prohibition flag in an external writable/referable non-volatile memory.

As an example, a description will be given of a mode in which a job request with a deletion prohibition flag is stored in the storage unit 32 of the vehicle cloud server 30. In this case, when determining, at step S102 of the flowchart in FIG. 6, that the deletion prohibition flag is included in the job request received from the vehicle cloud server 30, the in-vehicle terminal 20 transmits, to the vehicle cloud server 30 at the step S103, write instructions that the job request should m be stored in the non-volatile memory. Accordingly, the in-vehicle terminal 20 can cause the vehicle cloud server 30 to appropriately manage the job request. Further, in this case, in the process executed at the time of restarting after the power is turned off in FIG. 7, the in-vehicle terminal 20 reads out the job request at the step S203 by accessing the URL or the like indicative of the memory area of the vehicle cloud server 30 in which the job request is written. Thereby, the in-vehicle terminal 20 can suitably refer to the job request.

BRIEF DESCRIPTION OF REFERENCE NUMBERS

- 20 In-vehicle terminal
- 27 Sensor unit
- 30 Vehicle cloud server
- 40 Service cloud server

The invention claimed is:

1. An in-vehicle terminal for vehicle data collection, the in-vehicle terminal comprising:
   a processor configured to:
   receive, from a detection device, detection information;
   receive, from an external device, a job request which includes a flag associated with a power off status of a vehicle, wherein the job request includes information for requesting transmission of the detection information;
   in a case where the job request includes a first flag,
      store the job request on a first memory, wherein the first memory maintains the job request when the vehicle is in a power off status;
   in a case where the job request includes a second flag,
      store the job request on a second memory, wherein the second memory deletes the job request when the vehicle is in the power off status; and
   in a case where the vehicle has restarted from the power off status,
      execute the job request maintained in the first memory;
   transmit, to the external device, the detection information; and
   calculate, by the external device, insurance premiums of the vehicle based on the detection information.

2. The in-vehicle terminal according to claim 1,
   wherein the job request is generated by a second external device, and
   wherein the second external device transmits the job request to the external device.

3. The in-vehicle terminal according to claim 1,
   wherein the detection information is the data to be collected by the in-vehicle terminal.

4. The in-vehicle terminal according to claim 3,
   wherein the processor is configured to receive data collection condition information that is information associated with a collection condition of the detection information detected by the detection device.

5. The in-vehicle terminal according to claim 1, wherein the power off status indicates a state where power is not supplied to the vehicle.

6. The in-vehicle terminal according to claim 1, wherein the processor is configured to further receive expiration date information that includes an expiration date of the flag, and
   wherein the flag includes information on maintaining the job request within the expiration date indicated by the expiration date information.

7. The in-vehicle terminal according to claim 6, wherein the job request includes information on collection of information necessary for calculating the insurance premiums of the vehicle, and
   wherein the expiration date is set based on a period of the insurance premiums.

8. The in-vehicle terminal according to claim 1,
   wherein the in-vehicle terminal includes a server device which transmits the job request to a terminal device which collects the data.

9. A computer-implemented method for vehicle data collection, said method comprising:
   receiving, from a detection device, detection information;
   receiving, from an external device, a job request which includes a flag associated with a power off status of a vehicle, wherein the job request includes information for requesting transmission of the detection information;
   in a case where the job request includes a first flag,
      storing the job request on a first memory, wherein the first memory maintains the job request when the vehicle is in a power off status;
   in a case where the job request includes a second flag,
      storing the job request on a second memory, wherein the second memory deletes the job request when the vehicle is in the power off status; and
   in a case where the vehicle has restarted from the power off status,
      executing the job request maintained in the first memory;
   transmitting, to the external device, the detection information; and
   calculating, by the external device, insurance premiums of the vehicle based on the detection information.

10. A non-transitory computer-readable medium including executable instructions for vehicle data collection executed by a processor, the instructions comprising:
    receiving, from a detection device, detection information;
    receiving, from an external device, a job request which includes a flag associated with a power off status of a vehicle, wherein the job request includes information for requesting transmission of the detection information;
    in a case where the job request includes a first flag,
       storing the job request on a first memory, wherein the first memory maintains the job request when the vehicle is in a power off status;
    in a case where the job request includes a second flag,
       storing the job request on a second memory, wherein the second memory deletes the job request when the vehicle is in the power off status; and
    in a case where the vehicle has restarted from the power off status,
       executing the job request maintained in the first memory;
    transmitting, to the external device, the detection information; and
    calculating, by the external device, insurance premiums of the vehicle based on the detection information.

* * * * *